Nov. 11, 1969  R. M. STRICKLAND  3,477,076

CHASER-POSITIONING DEVICE FOR THREAD-CUTTING DIE HEADS

Filed Aug. 29, 1967

INVENTOR:
ROYCE M. STRICKLAND

BY *Stewart & Stewart* his Attorneys.

United States Patent Office 3,477,076
Patented Nov. 11, 1969

3,477,076
CHASER-POSITIONING DEVICE FOR THREAD-CUTTING DIE HEADS
Royce M. Strickland, New Haven, Conn., assignor to United-Greenfield Corporation, Chicago, Ill., a corporation of Delaware
Filed Aug. 29, 1967, Ser. No. 664,168
Int. Cl. B23g 5/10
U.S. Cl. 10—104        4 Claims

ABSTRACT OF THE DISCLOSURE

A chaser-positioning device for thread-cutting die heads with holders for each chaser, in which an adjustable positioning member is mounted on each holder for engagement with a gauging surface on the chaser adjacent the cutting tip. Once the chaser has been adjusted on the holder it can be removed for resharpening and replaced any number of times without re-adjusting the positioning stop during a prolonged threading operation.

---

This invention relates to thread-cutting tools and it relates more particularly to means for positioning each thread-cutting chaser in its holder, so that once adjusted, it can be removed from the holder any number of times for sharpening or replacement and returned to the holder each time with assurance that its cutting tip will be accurately located on the holder without further adjustment.

In high-production threading operations where the same threading job is carried out over long periods of time, the chasers on each die head may need to be resharpened many times. They are usually removed from the holders in the die head and replaced each time they are sharpened. It has been standard practice when replacing the chasers to adjust them each time individually to precisely the correct position on their holders so that each one does its share of work in threading the piece. The conventional way to make such adjustment is to hold a setting gauge against a reference surface on the holder and to move the chaser inward until its cutting tip engages the gauge, as shown for example in the U.S. patent to Reimschissel Re. 20,930. The chaser is then clamped rigidly in place on its holder. This is a critical adjustment, requiring greater skill than can be expected of the ordinary screw-machine operator. A machinist must therefore be called each time the chasers are removed, even though the die head continues to be used for the same threading job and requires no other adjustment.

Not only has the mere change of chasers required the services of a machinist, but also considerable time is taken up in resetting all the chasers each time they are sharpened. Furthermore, in order to remove the chasers from the holders a positioning screw usually has to be backed completely out, or the holders may have to be removed from the die head. These operations and adjustments have added substantially to the amount of down-time of the machines.

An object of the present invention is to simplify the operation of changing chasers and to reduce the amount of down-time of the screw-threading machine.

Substantial time can be saved by using the chaser-positioning device of this invention, wherein a chaser-positioning stop is mounted on each holder so that a stop portion is disposed for engagement with a gauging surface on the chaser, in order to positively locate its cutting tip with respect to the center of the work. Since the stop is a permanent part of each holder, it remains in place on the holder at all times for relocating the chaser whenever the latter is removed from its holder. When a chaser is replaced, it is simply moved into engagement with the positioning stop on the holder so that its cutting tip is located in exactly the same place each time. On the other hand, when the die head is to be used for a different threading job, the positioning stops on the holders can be adjusted in order to reposition the chasers on the holders.

Since it would interfere with the operation of the chaser, the positioning stop of the present invention can not engage the actual cutting tip of the chaser, as in the case of conventional resetting gauges, such as that disclosed in the above-mentioned Reimschissel patent. However, in order to relocate the cutting tip of the chaser precisely in the holder each time it is removed for re-sharpening, it is essential that the positioning stop engage a surface on the chaser which is always disposed in exactly the same relation to the cutting tip, despite the fact that a portion of the stock is removed from the cutting face of the chaser each time it is sharpened. A suitable reference point on each chaser must therefore be selected for engagement by the positioning stop so that the chaser can be accurately positioned in the holder.

In die heads which employ chasers that engage the work tangentially, the cutting face of the chaser at one end thereof is a flat surface disposed at a predetermined angle to a serrated under surface, the cutting tip at the intersection of these surfaces having teeth which form the threads in the work. When the chaser is sharpened, the cutting face is ground uniformly and its original angle with the serrated surface of the chaser is carefully maintained. Consequently, so long as the stop can engage the cutting face without interfering with the workpiece as it is being threaded, a portion of the cutting face may provide a suitable gauging surface for the positioning stop of the present invention. Usually, however, some other portion of the chaser adjacent its cutting tip, such as the end of the dovetail rib by which it is clamped in the holder, can be used as a gauging surface and ground with the cutting face when the chaser is sharpened. Consequently, the end of the dovetail rib on the chaser provides an excellent gauging surface for the positioning stop, because it is spaced from the cutting tip of the chaser and at the same time remains in exactly the same relation thereto after sharpening. The cutting tip therefore always returns to exactly the same position on the holder when the gauging surface on the chaser abuts the positioning stop. The cutting face of a tangential chaser, moreover, recedes at an accurately predetermined angle from the cutting tip, thereby helping to provide clearance for the positioning stop so that it can contact the chaser without interfering with the working portion thereof.

It will be apparent from the foregoing that the term "gauging surface" as employed herein refers to a surface on the chaser adjacent the cutting tip which is ground down uniformly with the cutting face of the chaser when it is sharpened. Thus, the gauging surface may be a portion of the cutting face itself or a surface adjacent thereto and coplanar therewith.

The invention and its advantages will become more apparent from the detailed description hereinafter of a preferred embodiment thereof as incorporated in a tangential-chaser type of threading die head, reference being had to the accompanying drawings, wherein FIG. 1 is a front view of a chaser-holder and chaser, including the positioning stop of the present invention, the periphery of the die head and a second chaser-holder assembly being shown schematically in broken lines;

Figure 1:
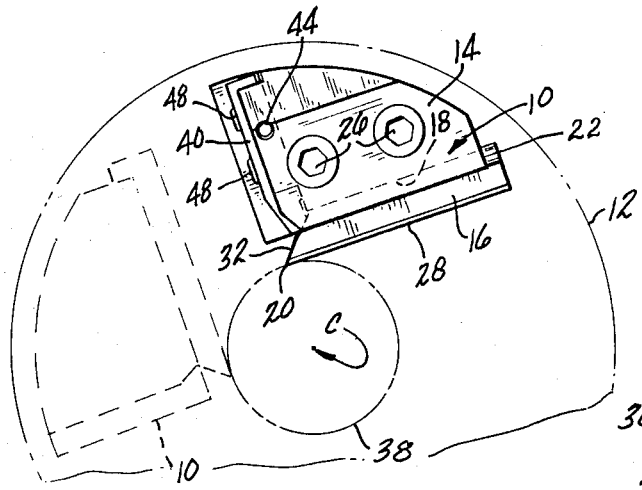

Referring to FIG. 1, a single chaser-holder assembly 10 is shown in full lines in the usual position on a die head 12, indicated by the large broken-line circle. It will be understood that a plurality of chasers and holders therefor are provided on the front face of the die head, a second being shown in broken lines in FIG. 1. Each chaser-holder assembly consists of a holder 14 and a chaser 16, which is rigidly secured in the holder 14 in a well-known manner, as shown for example in the patent to Breitenstein 1,756,277.

Figure 2:
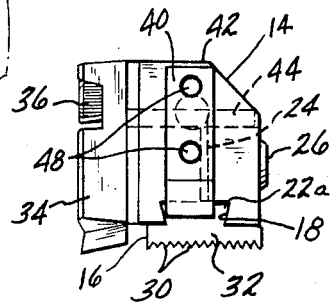
FIG. 2 is an inner end view of the chaser-holder assembly shown in FIG. 1.
Figure 3:
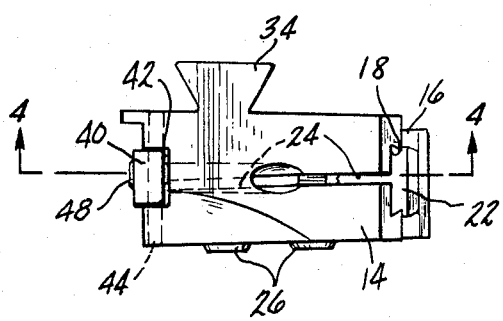
FIG. 3 is a plan view thereof.

The holder 14 is provided on its underside with a dovetail groove 18 for mounting a chaser 16. Groove 18 extends parallel to a tangent to the workpiece at the point of engagement of the cutting tip 20 of the chaser with the workpiece, the center of which is indicated at point C in FIG. 1. A dovetail rib 22 extending longitudinally along one side of the chaser 16 fits closely within the mounting groove 18, one side of which can be resiliently flexed inward in order to grip the rib 22 of the chaser and clamp it in place. To this end, holder 14 is slotted length-wise at 24 along groove 18 as shown in FIGS. 2 and 3. A pair of clamping bolts 26 extend transversely across slot 24 into threaded engagement with a rear portion of the holder, such that when they are tightened down the outer side of the holder is flexed inwardly against the rib 22 of the chaser 16 rigidly clamping the chaser to the holder 14. The underside 28 of the chaser 16 opposite its dovetail rib 22 is longitudinally serrated in order to form the thread-cutting teeth 30 at the cutting tip 20 where the serrated surface 28 intersects the cutting face 32.

Figure 5:
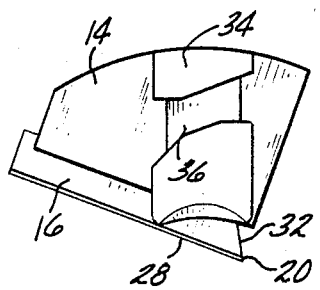
FIG. 5 is a rear view thereof.
Figure 4:
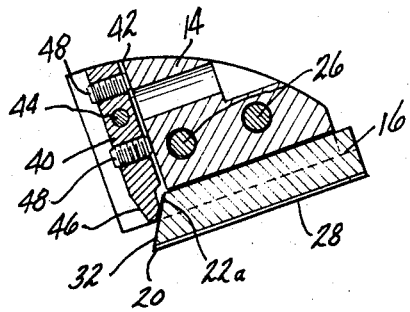
FIG. 4 is a longitudinal section taken on the line 4—4 of FIG. 3.

The holder hereshown is for use in self-opening die heads, wherein the chasers automatically move radially out of engagement with the workpiece when the desired length of thread has been cut. As may be best seen in FIGS. 2, 3 and 5, holder 14 is provided on its rear face with a dovetail tang 34 wich projects rearwardly therefrom for guided engagement with one of several radial guideways (not shown) provided in the face of the die head 12. A cam lug (also not shown) in the die head engages within a cam slot 36 in the tang 34 for moving the holder assembly 10 radially into and out of work-engaging position.

Once the chaser-holder assemblies are mounted on the die head, it is necessary to position the chasers 16 longitudinally within the dovetail grooves 18 of the holders 14, so that the cutting tip 20 of each chaser is disposed at exactly the desired distance from the central axis C of the die head and of the workpiece, as represented by the brokenline circle 38 (FIG. 1). Various means have been employed for making this adjustment. For example, in the beforementioned patent to Breitenstein 1,756,277, an adjusting screw is provided which extends parallel to the chaser and engages the outer end thereof, so that when the clamping screws are only nipped down lightly, the chaser can be moved longitudinally in the holder by the adjusting screw into the desired position. A setting gauge such as that shown in the before-mentioned patent to Reimschissel must be used by Breitenstein in adjusting the chasers before the clamping screws are tightened. In such constructions it is of course necessary to reset the chasers in their holders with a setting gauge each time they are removed for sharpening. Furthermore, the adjusting screw for each chaser must be completely backed off, in order to remove the chaser from the holder, and then this screw must be threaded back in again when the chaser is reset.

In accordance with the present invention an adjustable positioning stop 40 is provided on each holder 14 for positively locating the chaser each time it is placed in the holder. In this instance the positioning stop 40 comprises a rectangular member disposed within a groove 42 in the leading side of holder 14. Stop 40 is pivotally mounted intermediate its ends on a pin 44, which is fixed at both ends in the holder 14 at opposite sides of groove 42. The inner end 46 of the positioning stop extends into alignment with the dovetail groove 18 in which the chaser is held and provides a stop-portion, against which the inner end of the chaser abuts when it is positioned correctly in the holder 14. A pair of set-screws 48, 48 are provided, one on each side of pivot pin 44, for adjusting the position of the end 46 of stop 40 longitudinally of the groove 18. Set screws 48 are threaded to and extend through the stop 40 so that their ends can engage the bottom of groove 42. Consequently, by turning one screw 48 out and the other in, the positioning stop can be pivoted in order to locate the cutting tip 20 of the chaser exactly on the required diameter 38 for the thread specified.

It will be noted that the positioning stop 40 actually engages the end 22a of the dovetail rib 22 of the chaser, the end-surface 22a being co-extensive with the cutting face 32 of the chaser so that when the chasers are sharpened by grinding the cutting face, the end-surface 22a is ground a like amount. Thus, when the chaser is replaced in the holder 14 each time it is sharpened and is slid in the groove 18 into engagement with the positioning stop 40, the cutting tip 20 invariably returns to exactly the same position it was in when originally adjusted. The clamping screws 26 can therefore be tightened immediately in order to rigidly clamp the chaser in place as it is manually held in engagement with the positioning stop. No special skill is required in removing and replacing the chasers once they have been properly adjusted for the job. Furthermore, since the cutting face of all chasers for a particular threading job will be ground at exactly the same angle to the serrated face of the chaser, new chasers can be used without re-adjusting the positioning stop. In fact, in order to minimize down-time, a spare set of chasers should be kept on hand during long runs of a particular threading operation, so that when the chasers in use require sharpening they can be removed from their holders and immediately replaced by the spare set. The threading tool can then continue to run, while the dull set of chasers are being sharpened.

What is claimed is:

1. In a screw-threading die head, a chaser-positioning device comprising in combination a chaser having a gauging surface adjacent its cutting tip, a chaser-holder having elongated mounting means for adjustably fixing said chaser in thread-cutting position longitudinally of said mounting means, means for clamping said chaser in said position, a chaser-positioning member mounted on said chaser-holder and having a stop-portion disposed for abutting engagement with said gauging surface at a point spaced from the cutting tip of the chaser, and means for adjusting said chaser-positioning member in order to move said stop-portion longitudinally of said chaser mounting means.

2. The combination defined in claim 1, wherein said chaser-positioning member is elongated and pivoted at a point intermediate its ends on said chaser-holder, one end of said chaser-positioning member comprising said stop-portion, and a pair of adjusting screws for adjustably fixing said chaser-positioning member relative to said chaser-holder.

3. The combination defined in claim 2, wherein said adjusting screws are threadedly mounted on said chaser-positioning member on opposite sides of its pivot point and extend into engagement with said chaser-holder.

4. The combination defined in claim 2, wherein said chaser-mounting means comprises a dovetail groove in which a dovetail rib on said chaser fits and said clamping means comprises clamping screws for flexing the sides of said dovetail groove into gripping engagement with said dovetail rib, said gauging surface of said chaser comprising an end surface of said dovetail rib which is disposed in the same plane with the cutting face of said chaser.

References Cited
UNITED STATES PATENTS

| | | | |
|---|---|---|---|
| Re. 20,930 | 11/1938 | Reimschissel | 10—104 |
| 1,756,277 | 4/1930 | Breitenstein | 10—104 |
| 2,239,736 | 4/1941 | Reimschissel et al. | 10—104 |
| 2,499,971 | 3/1950 | Reimschissel | 10—104 |
| 2,571,944 | 10/1951 | Reimschissel et al. | 10—104 |

CHARLES W. LANHAM, Primary Examiner

E. M. COMBS, Assistant Examiner